(12) United States Patent
Yao

(10) Patent No.: US 11,580,983 B2
(45) Date of Patent: Feb. 14, 2023

(54) SIGN LANGUAGE INFORMATION PROCESSING METHOD AND APPARATUS, ELECTRONIC DEVICE AND READABLE STORAGE MEDIUM

(71) Applicant: Baidu Online Network Technology (Beijing) Co., Ltd., Beijing (CN)

(72) Inventor: Miao Yao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 769 days.

(21) Appl. No.: 16/514,180

(22) Filed: Jul. 17, 2019

(65) Prior Publication Data
US 2020/0075011 A1 Mar. 5, 2020

(30) Foreign Application Priority Data
Aug. 31, 2018 (CN) .......................... 201811009994.8

(51) Int. Cl.
*G10L 15/25* (2013.01)
*G09B 21/00* (2006.01)
(Continued)

(52) U.S. Cl.
CPC ............ *G10L 15/25* (2013.01); *G06V 40/171* (2022.01); *G06V 40/28* (2022.01); *G09B 21/009* (2013.01); *G10L 15/1815* (2013.01)

(58) Field of Classification Search
USPC ....................................................... 434/112
See application file for complete search history.

(56) References Cited

U.S. PATENT DOCUMENTS

| 6,181,778 B1* | 1/2001 | Ohki ................. H04N 21/4884 348/704 |
| 7,487,096 B1* | 2/2009 | Cox ...................... G10L 15/187 704/277 |

(Continued)

FOREIGN PATENT DOCUMENTS

| CN | 101727766 A | 6/2010 |
| CN | 104732590 A | 6/2015 |

(Continued)

*Primary Examiner* — Thuykhanh Le
(74) *Attorney, Agent, or Firm* — Harness, Dickey & Pierce, P.L.C.

(57) ABSTRACT

Sign language information processing method and apparatus, an electronic device and a readable storage medium provided by the present disclosure, achieve real-time collection of language data in a current communication of a user by obtaining voice information and video information collected by a user terminal in real time; and then match a speaking person with his or her speaking content by determining, in the video information, a speaking object corresponding to the voice information; and finally, make it possible for the user to clarify the corresponding speaking object when the user sees AR sign language animation in a sign language video by superimposing and displaying an augmented reality AR sign language animation corresponding to the voice information on a gesture area corresponding to the speaking object to obtain a sign language video. Therefore, it is possible to provide a higher user experience.

20 Claims, 5 Drawing Sheets

Speaking object A

Speaking object B

(51) Int. Cl.
*G10L 15/18* (2013.01)
*G06V 40/20* (2022.01)
*G06V 40/16* (2022.01)

(56) References Cited

U.S. PATENT DOCUMENTS

| | | | |
|---|---|---|---|
| 7,653,543 B1* | 1/2010 | Blair | G10L 17/26 704/271 |
| 10,074,381 B1* | 9/2018 | Cowburn | G06F 40/58 |
| 10,089,067 B1* | 10/2018 | Abuelsaad | G10L 17/22 |
| 10,453,459 B2* | 10/2019 | Florexil | G09B 21/009 |
| 10,489,032 B1* | 11/2019 | Margolin | G06F 21/6245 |
| 10,607,069 B2* | 3/2020 | Shahar | G06V 10/34 |
| 10,733,802 B2* | 8/2020 | Jurgenson | G06T 19/20 |
| 10,936,830 B2* | 3/2021 | Florexil | G06F 1/163 |
| 10,990,756 B2* | 4/2021 | Shanmugam | G06F 40/232 |
| 10,991,367 B2* | 4/2021 | Aoki | G10L 15/30 |
| 10,997,783 B2* | 5/2021 | Jurgenson | G06T 19/006 |
| 11,050,807 B1* | 6/2021 | Palmer | G10L 15/26 |
| 11,100,715 B2* | 8/2021 | de Jong | G06F 3/011 |
| 11,126,405 B1* | 9/2021 | Pasic | G06F 40/216 |
| 11,195,018 B1* | 12/2021 | Cowburn | G06T 7/11 |
| 11,417,343 B2* | 8/2022 | Cohen | G10L 17/20 |
| 11,482,134 B2* | 10/2022 | Jung | G06V 40/174 |
| 11,520,995 B2* | 12/2022 | Mahajan | G06F 40/30 |
| 11,526,854 B2* | 12/2022 | Gonzalez, Jr. | G06F 16/9554 |
| 2002/0031262 A1* | 3/2002 | Imagawa | H04N 21/41407 348/E7.078 |
| 2008/0103907 A1* | 5/2008 | Maislos | G06Q 30/0269 705/14.54 |
| 2009/0118593 A1* | 5/2009 | Jung | G16H 40/63 600/300 |
| 2009/0132275 A1* | 5/2009 | Jung | G16H 40/67 600/300 |
| 2009/0158136 A1* | 6/2009 | Rossano | H04L 61/4594 715/810 |
| 2013/0021459 A1* | 1/2013 | Vasilieff | G10L 25/78 348/E7.085 |
| 2013/0100166 A1* | 4/2013 | Nonaka | G06T 11/60 345/636 |
| 2014/0046661 A1* | 2/2014 | Bruner | H04N 21/6582 704/235 |
| 2014/0081634 A1* | 3/2014 | Forutanpour | G06F 40/58 704/235 |
| 2014/0088961 A1* | 3/2014 | Woodward | G10L 15/22 704/235 |
| 2015/0120293 A1* | 4/2015 | Wohlert | G10L 21/10 704/235 |
| 2015/0154983 A1* | 6/2015 | VanBlon | G10L 25/87 704/233 |
| 2015/0331193 A1* | 11/2015 | Abiri | H04B 10/671 250/227.12 |
| 2015/0331493 A1* | 11/2015 | Algreatly | G06F 3/005 345/156 |
| 2016/0191958 A1* | 6/2016 | Nauseef | G06V 40/20 725/116 |
| 2018/0285752 A1* | 10/2018 | Yu | G10L 15/27 |
| 2018/0293236 A1* | 10/2018 | Xiang | G06V 40/161 |
| 2018/0374477 A1* | 12/2018 | Kim | G10L 25/78 |
| 2019/0147851 A1* | 5/2019 | Kizuki | G10L 15/26 704/251 |
| 2019/0155617 A1* | 5/2019 | Buchanan | G06V 40/50 |
| 2019/0171716 A1* | 6/2019 | Weber | H04N 7/15 |
| 2019/0236396 A1* | 8/2019 | Ronen | G06V 30/153 |
| 2019/0251344 A1* | 8/2019 | Menefee | G06T 7/20 |
| 2019/0318159 A1* | 10/2019 | Blanc-Paques | G06Q 50/30 |
| 2019/0341055 A1* | 11/2019 | Krupka | G10L 25/84 |
| 2020/0121888 A1* | 4/2020 | Haneda | G05D 1/02 |
| 2021/0150145 A1* | 5/2021 | Negishi | G06F 3/017 |
| 2021/0295837 A1* | 9/2021 | Toda | G10L 15/22 |
| 2021/0377593 A1* | 12/2021 | Kwon | G06F 3/0482 |

FOREIGN PATENT DOCUMENTS

| | | |
|---|---|---|
| CN | 105915798 A | 8/2016 |
| CN | 107409061 A | 11/2017 |
| CN | 107609045 A | 1/2018 |
| CN | 107798964 A | 3/2018 |

* cited by examiner

SIGN LANGUAGE INFORMATION PROCESSING METHOD AND APPARATUS, ELECTRONIC DEVICE AND READABLE STORAGE MEDIUM

CROSS-REFERENCE TO RELATED APPLICATION

This application claims priority to Chinese Patent Application No. 201811009994.8, filed on Aug. 31, 2018, which is hereby incorporated by reference in its entirety.

TECHNICAL FIELD

The present disclosure relates to the field of information processing technology, and, in particular, to sign language information processing method and apparatus, an electronic device and a readable storage medium.

BACKGROUND

Sign language is the most important means of communication for a person with hearing impairment such as a deaf-mute. However, since most persons with normal hearing do not understand sign language, it is difficult for the person with hearing impairment to communicate with a person with normal hearing normally, making it difficult for the person with hearing impairment to integrate into society. In order to open a communication channel between the person with hearing impairment and the person with normal hearing, it is usually necessary to convert and translate a sign language of the person with hearing impairment and a voice of the person with normal hearing to each other.

In an existing sign language translation technology, a person with hearing impairment and a person with normal hearing each holds a voice-sign language translator. The voice-sign language translator collects a gesture action of the person with hearing impairment and an input voice of the person with normal hearing, and then recognizes and translates the gesture action into a voice for outputting, and recognizes and translates the input voice into a text for outputting.

However, in the prior art, binoculus of the person with hearing impairment needs to pay attention to the translated text information at all times during a communication with the person with normal hearing. However, in a scenario where many people speak and discuss, even if a deaf-mute has a voice-sign language translator, it is difficult for the deaf-mute to distinguish that a voice is made by which speaking object when it is necessary to read the text information, and thus it is impossible to discern a view of each speaking object and is difficult to achieve normal communication. It can be seen that an existing voice-sign language translation method has difficulty in distinguishing speaking objects, thereby resulting a poor user experience.

SUMMARY

The present disclosure provides sign language information processing method and apparatus, an electronic device and a readable storage medium, which can distinguish speaking objects, improve a user experience, and improve a reliability of sign language information processing.

According to a first aspect of the present disclosure, a sign language information processing method is provided, which includes:

obtaining voice information and video information collected by a user terminal in real time;

determining, in the video information, a speaking object corresponding to the voice information; and superimposing and displaying an augmented reality AR sign language animation corresponding to the voice information on a gesture area corresponding to the speaking object to obtain a sign language video.

In a possible implementation of the first aspect, the determining, in the video information, a speaking object corresponding to the voice information includes:

recognizing at least one face image in the video information;

determining a face image showing an opening and closing action of a lip as a target face image; and determining a portrait corresponding to the target face image as the speaking object corresponding to the voice information.

In another possible implementation of the first aspect, after the determining a portrait corresponding to the target face image as the speaking object corresponding to the voice information, the method further includes:

obtaining sound attribute information corresponding to the voice information; and associating and storing the sound attribute information and the target face image.

In still another possible implementation of the first aspect, the determining, in the video information, a speaking object corresponding to the voice information includes:

obtaining sound attribute information corresponding to the voice information;

determining, in a pre-stored face set, a historical face image corresponding to the sound attribute information;

searching, in the video information, for a target face image that matches the historical face image; and determining a portrait corresponding to the target face image as the speaking object corresponding to the voice information.

In yet another possible implementation of the first aspect, the sound attribute information includes: amplitude information, audio information, and/or accent cycle information.

In yet another possible implementation of the first aspect, before the superimposing and displaying an augmented reality AR sign language animation corresponding to the voice information on a gesture area corresponding to the speaking object to obtain a sign language video, the method further includes:

performing a semantic recognition on the voice information to obtain voice text information;

querying, in a pre-stored AR gesture animation, at least one AR gesture animation corresponding to the voice text information; and obtaining a sign language AR animation corresponding to the voice information according to the at least one AR gesture animation.

In yet another possible implementation of the first aspect, before the superimposing and displaying an augmented reality AR sign language animation corresponding to the voice information on a gesture area corresponding to the speaking object to obtain a sign language video, the method further includes:

determining, in the video information, an area around a face of the speaking object; and determining, in the area around the face, the gesture area corresponding to the speaking object.

In yet another possible implementation of the first aspect, further including:

obtaining gesture action information of a user himself in the video information;

obtaining action text information of the gesture action information;

searching, in a pre-stored voice information, for user voice information corresponding to the action text information; and playing the user voice information.

In yet another possible implementation of the first aspect, the obtaining gesture action information of a user himself in the video information includes:

obtaining a distance of a gesture-like image in the video information, where the distance indicates a distance between hands corresponding to the gesture-like image and a camera; and determining a gesture-like image whose distance is less than a threshold as the gesture action information of the user himself.

According to a second aspect of the present disclosure, a sign language information processing apparatus is provided, which includes:

a collecting module, configured to obtain voice information and video information collected by a user terminal in real time;

a recognizing module, configured to determine, in the video information, a speaking object corresponding to the voice information; and a processing module, configured to superimpose and display an augmented reality AR sign language animation corresponding to the voice information on a gesture area corresponding to the speaking object to obtain a sign language video.

In a possible implementation of the second aspect, the recognizing module is specifically configured to:

recognize at least one face image in the video information;

determine a face image showing an opening and closing action of a lip as a target face image; and determine a portrait corresponding to the target face image as the speaking object corresponding to the voice information.

In another possible implementation of the second aspect, the recognizing module, after determining the portrait corresponding to the target face image as the speaking object corresponding to the voice information, is further configured to:

obtain sound attribute information corresponding to the voice information; and associate and store the sound attribute information and the target face image.

In still another possible implementation of the second aspect, the recognizing module is specifically configured to:

obtain sound attribute information corresponding to the voice information;

determine, in a pre-stored face set, a historical face image corresponding to the sound attribute information;

search, in the video information, for a target face image that matches the historical face image; and determine a portrait corresponding to the target face image as the speaking object corresponding to the voice information.

In yet another possible implementation of the second aspect, the sound attribute information includes: amplitude information, audio information, and/or accent cycle information.

In yet another possible implementation of the second aspect, the apparatus further includes a voice translating module, configured to:

before the processing module superimposes and displays the augmented reality AR sign language animation corresponding to the voice information on the gesture area corresponding to the speaking object to obtain the sign language video, perform a semantic recognition on the voice information to obtain voice text information;

query, in a pre-stored AR gesture animation, at least one AR gesture animation corresponding to the voice text information; and obtain a sign language AR animation corresponding to the voice information according to the at least one AR gesture animation.

In yet another possible implementation of the second aspect, the processing module, before the superimposing and displaying an augmented reality AR sign language animation corresponding to the voice information on a gesture area corresponding to the speaking object to obtain a sign language video, is further configured to:

determine, in the video information, an area around a face of the speaking object; and determine, in the area around the face, the gesture area corresponding to the speaking object.

In yet another possible implementation of the second aspect, the apparatus further includes a sign language translating module, configured to:

obtain gesture action information of a user himself in the video information;

obtain action text information of the gesture action information;

search, in a pre-stored voice information, for user voice information corresponding to the action text information; and play the user voice information.

In yet another possible implementation of the second aspect, the sign language translating module is specifically configured to:

obtain a distance of a gesture-like image in the video information, where the distance indicates a distance between hands corresponding to the gesture-like image and a camera; and determine a gesture-like image whose distance is less than a threshold as the gesture action information of the user himself.

According to a third aspect of the present disclosure, an electronic device is provided, which includes: a memory, a processor and a computer program, where the computer program is stored in the memory, the processor runs the computer program to perform the sign language processing method according to the first aspect and various possible designs of the first aspect of the present disclosure.

According to a fourth aspect of the present disclosure, a readable storage medium is provided, where the readable storage medium stores a computer program, and the computer program, when executed by a processor, implements the sign language information processing method according to the first aspect and various possible designs of the first aspect of the present disclosure.

Sign language information processing method and apparatus, an electronic device and a readable storage medium provided by the present disclosure, achieve real-time collection of language data in a current communication of a user by obtaining voice information and video information collected by a user terminal in real time; and then match a speaking person with his or her speaking content by determining, in the video information, a speaking object corresponding to the voice information; and finally, make it possible for the user to clarify the corresponding speaking object when the user sees AR sign language animation in a sign language video by superimposing and displaying an augmented reality AR sign language animation corresponding to the voice information on a gesture area corresponding to the speaking object to obtain a sign language video. Therefore, it is possible to distinguish the speaking content of each speaking person in a multi-person discussion, clarify a viewpoint of each conversation object, thereby achieving normal communication with a person with normal hearing, and providing a higher user experience.

DETAILED DESCRIPTION OF THE EMBODIMENTS

Figure 1:
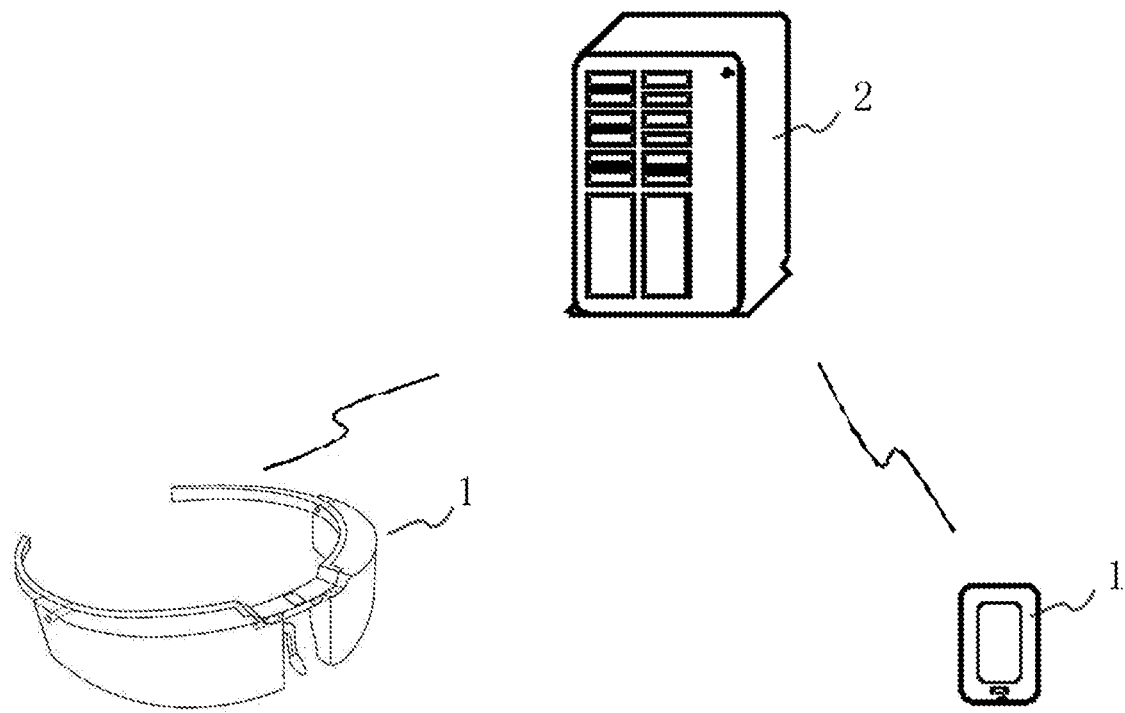
FIG. 1 is a schematic diagram of an application scenario provided by an embodiment of the present disclosure.

In order to make the objectives, technical solutions, and advantages of embodiments of the present disclosure more clearly, the technical solutions in the embodiments of the present disclosure will be clearly and completely described in the following with reference to the accompanying drawings in the embodiments of the present disclosure. It is obvious that the described embodiments are only a part of the embodiments, but not all embodiments, of the present disclosure. All other embodiments obtained by those skilled in the art based on the embodiments of the present disclosure without inventive efforts are within the scope of the present disclosure.

The terms "first", "second", "third", "fourth", etc. (if present) in the description and claims of the present disclosure and the above drawings are used to distinguish similar objects without being necessarily used to describe a specific order or an order of priority. It should be understood that the data so used may be interchanged where appropriate, so that the embodiments of the present disclosure described herein can be implemented in an order other than those illustrated or described herein.

It should be understood that, in various embodiments of the present disclosure, the magnitude of the sequence numbers of the processes does not imply an order of execution, and the order of execution of the processes should be determined by its function and internal logic, and should not constitute any limitation on the implementation process of the embodiments of the present disclosure.

It should be understood that in the present disclosure, "comprising" and "including" and any variants thereof are intended to cover a non-exclusive inclusion, for example, a process, method, system, product, or device that includes a series of steps or units is not necessarily limited to those steps or units that are clearly listed, but may include other steps or units that are not clearly listed or inherent to such process, method, product or device.

It should be understood that in the present disclosure, "multiple" means two or more. "and/or" is merely an association relationship describing associated objects, indicating that there may be three relationships, for example, and/or B, which may indicate three cases: A exists separately, A and B exist simultaneously, and B exists separately. The character "/" generally indicates that the contextual objects is an "or" relationship. "including A, B, and C" and "including A, B, C" means that A, B, and C are all included, and "including A, B, or C" means one of A, B, and C is included, and "including A, B, and/or C" means including any one or two or three of A, B, and C.

It should be understood that in the present disclosure, "B corresponding to A", "B corresponding to A", "corresponding to A and B" or "B corresponds to A" means that B is associated with A, and B can be determined according to A. Determining B according to A does not mean that B is only determined according to A, and B can also be determined according to A and/or other information. The match between A and B is that a similarity between A and B is greater than or equal to a preset threshold.

Depending on the context, "if" as used herein may be interpreted as "while" or "when" or "in response to determining" or "in response to detecting".

The technical solutions of the present disclosure will be described in detail below with specific embodiments. The following specific embodiments may be combined with each other, and the same or similar concepts or processes may not be described in some embodiments.

In the embodiments of the present disclosure, a video frame refers to a picture constituting a video. A video can be thought of as a sequence sequentially constituted with multiple video frames, and a playback of the video can be understood as sequentially displaying the video frames in the sequence. Since a display frequency of the video frames is larger than a range of values recognizable by human eyes, therefore, a dynamic continuously changing video screen seen by the human eyes is formed.

Referring to FIG. 1, it is a schematic diagram of an application scenario provided by an embodiment of the present disclosure. The application scenario shown in FIG. 1 may include a user terminal 1 and a server 2, where a number of the user terminal 1 may be one or more. The user terminal 1 may specifically be an electronic device having video and voice functions, such as a mobile phone, a computer, a digital broadcast terminal, a messaging device, a game console, a tablet device, a medical device, a fitness device, and a personal digital assistant, or the like, and further may be an AR wearing device such as an AR glasses and an AR helmet.

In the scenario shown in FIG. 1, a user may be a person with hearing impairment wearing or holding the user terminal 1. When the user terminal 1 captures a video of a scenario in front of the user in real time, the user views a sign language video in which a AR sign language animation is displayed in the video through the user terminal 1. The following various sign language information processing methods of the present disclosure may be completed only in the user terminal 1, or may be jointly performed by the user terminal 1 and the server 2.

In an implementation, the process of sign language information processing may mainly rely on the user terminal 1 for processing. For example, the user terminal 1 may be configured with a computer program for executing the sign language information processing and related data, so that the user terminal 1 uses local database information of the user terminal 1 to perform the sign language information processing on video information when the video information is captured, and displays a sign language video to the user after obtaining the same.

In another implementation, the process of sign language information processing may be performed jointly by both the user terminal 1 and the server 2. For example, it may be that some of the steps of the method of the following embodiments of the present disclosure are implemented by the user terminal 1, and another part of the steps are implemented by the server 2. For example, the following step S101 is performed by the user terminal 1 and then transmitted to the server 2, and the server 2 proceeds to perform steps S102-S103, and transmits a obtained sign language video back to the user terminal 1, and the user terminal 1 displays the sign language video to the user. Whether an execution body of the sign language information processing method of the present disclosure is a single individual or multiple individuals connected to each other is not limited.

Figure 2:
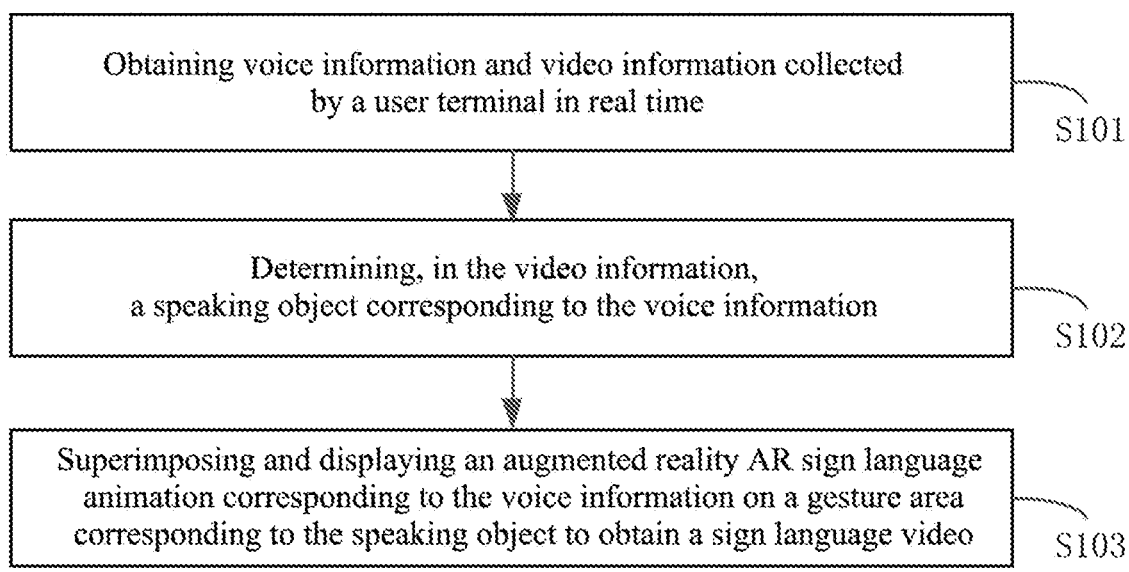
FIG. 2 is a schematic flowchart of a sign language information processing method provided by an embodiment of the present disclosure.

Referring to FIG. 2, it is a schematic flowchart of a sign language information processing method provided by an embodiment of the present disclosure. An execution body of the method shown in FIG. 2 may be software and/or hardware devices, such as the user terminal and/or server shown in FIG. 1. The method shown in FIG. 2 includes steps S101 to S103, which are specifically as follows:

S101: obtaining voice information and video information collected by a user terminal in real time.

It can be understood that current captured video information is actively obtained from a camera of the user terminal in real time; or when a user opens a sign language voice translation function or preset trigger information is obtained, the current captured video information is obtained from the camera of the user terminal.

For example, when voice information input is detected, the camera is turned on to start collection of video information, and then when the voice input ends for a predetermined period of time (20 minutes), the camera is turned off, and the collection of the video information is ended. Conversely, when the camera is turned on by the user, a microphone is turned on to start collecting voice information, and then when the user closes the camera to end the collection of the video information, the microphone is turned off, and the collection of the voice information is ended.

Figure 3:
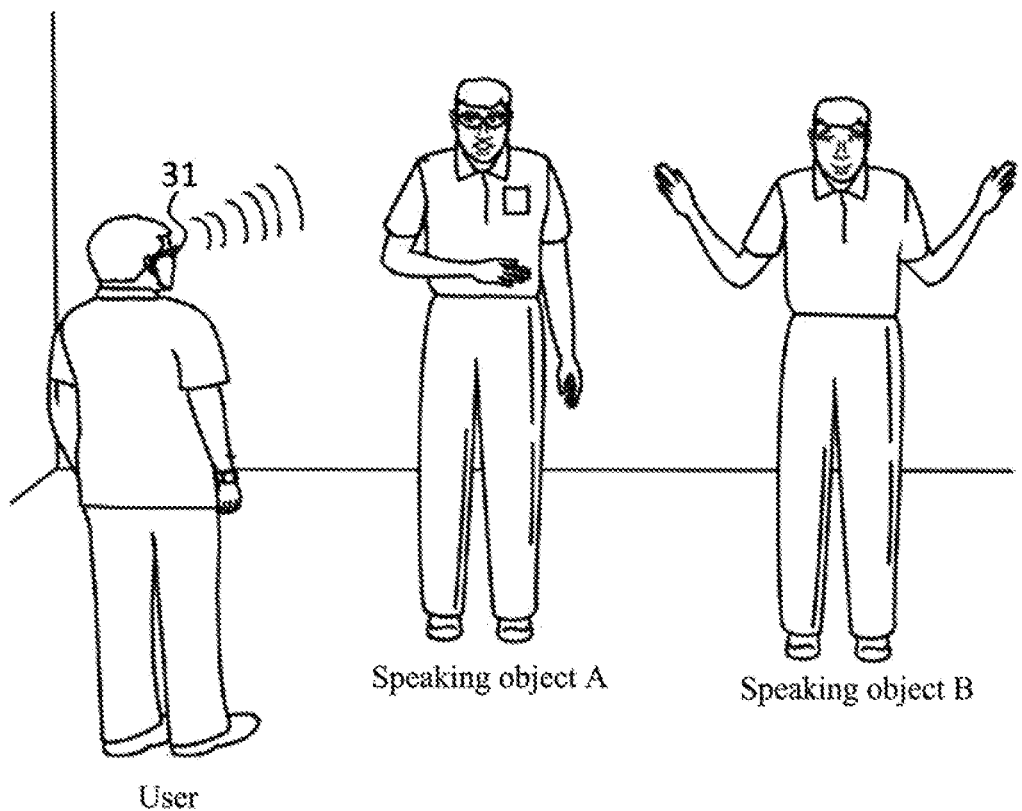
FIG. 3 is a schematic diagram of a user usage scenario provided by an embodiment of the present disclosure.

Referring to FIG. 3, it is a schematic diagram of a user usage scenario provided by an embodiment of the present disclosure. In the scenario shown in FIG. 3, the user is a person with hearing impairment, and both speaking object A and speaking object B are persons with normal hearing. The user terminal used by the user (the person with hearing impairment) is an AR glasses 31. The user wears the AR glasses 31, and during a conversation with the speaking object A and the speaking object B, the user's AR glasses 31 capture video information of the conversation process of the speaking object A and the speaking object B, and also collect voice messages sent by both of them.

S102: determining, in the video information, a speaking object corresponding to the voice information.

There may be multiple implementations for determining the speaking object corresponding to the voice information, and the following two optional implementations are used for exemplification.

In an implementation of step S102, which speaking object the currently collected voice information belongs to may be determined by recognizing a person currently speaking. Specifically, it may be that, at least one face image is recognized in the video information at first; and then a face image showing an opening and closing action of a lip is determined as a target face image; and finally a portrait corresponding to the target face image is determined as the speaking object corresponding to the voice information.

The method for recognizing at least one face image in the video information may be to perform a face recognition on video frames in the video information to obtain a face image when the video information is obtained. Specifically, the video information is obtained from a cache of the user terminal, or the video information is obtained from a cache of the server when the server receives the video information from the user terminal and stores the same in the cache. There may be multiple video frames parsed from the video information. Then, the video frames may be processed to obtain the face image in a manner of picture recognition and picture classification. For example, image classification based on pixel points is performed on the video frames by a semantic segmentation algorithm (for example, FCN algorithm) or an instance segmentation algorithm (for example, Mask RCNN algorithm), and face images in the video frames are recognized and located. Alternatively, face feature information is searched in the video frames, and a image area that conforms to face feature is used as a face area.

The face image showing the opening and closing action of the lip is determined as the target face image. The opening and closing operation of the lip can be understood as an action of a lip portion of the speaking object A or the speaking object B. The process of obtaining the face image showing the opening and closing action of the lip may be to sequentially detect lip open images and lip closed images for face images of a same person from face images of continuous video frames by using the above various image recognition methods within a preset time. For example, when a change of opening-closing-opening is detected in lip area image of the speaking object B in FIG. 3 within 2 seconds, it is determined that the face image of the speaking object B is the target face image.

After the target face image is obtained in the above, a portrait corresponding to the target face image can be determined as the speaking object corresponding to the voice information. The case where the face image of the speaking object B is the target face image is still taken as the example, the portrait including the target face image is taken as the speaking object, that is, the speaking object B in FIG. 3 is the speaking object that sends the voice information.

In an embodiment, after the determining a portrait corresponding to the target face image as the speaking object corresponding to the voice information, the method further includes a voice-face association process: obtaining sound attribute information corresponding to the voice information first; and then associating and storing the sound attribute information and the target face image. It can be understood that, in the above steps, the voice information and the speaking object corresponding to the voice information have been obtained, and thus the sound attribute information of the voice information can be analyzed. For voices of different persons, different sound attribute information can be obtained, such as voiceprint information corresponding to the person. Then, the face image for determining the speaking object and the sound attribute information obtained are associated and stored.

In another implementation of step S102, an acquaintance face corresponding to a sound may be pre-recorded, and then, when voice information corresponding to an existing sound is collected, the acquaintance face is searched in the video information as the face corresponding to the voice information, and then the speaking object is determined according to the face. Specifically, the sound attribute information corresponding to the voice information may be obtained first. The sound attribute information may be amplitude information, audio information, and/or accent cycle information. Because different persons have different pronunciation habits or accents, there will be differences in their sound attribute information, such as a habit of speaking in a specific accent cycle. Then, a historical face image corresponding to the sound attribute information is determined in a pre-stored face set. The pre-stored face set may include multiple face images, and each face image is associated with at least one pre-stored sound attribute information. By comparing the obtained sound attribute information with the pre-stored sound attribute information, sound attribute information matching the sound attribute information corresponding to the voice information is found in the pre-stored sound attribute information, so that the corresponding face image is taken as the historical face image. Next, a target face image that matches the historical face image is searched for in the video information. Finally, a portrait corresponding to the target face image is determined as the speaking object corresponding to the voice information.

In an embodiment, if the target face image that matches the historical face image is not found in the video information, the process in the previous implementation may be performed to recognize the person currently speaking to determine which speaking object the currently collected voice information belongs to.

S103: superimposing and displaying an augmented reality AR sign language animation corresponding to the voice information on a gesture area corresponding to the speaking object to obtain a sign language video.

It can be understood that the AR sign language animation corresponding to the voice information and the gesture area corresponding to the speaking object are first obtained, and then the AR sign language animation is superimposed and displayed in the gesture area to synthesize the sign language video.

In an implementation of obtaining the AR sign language animation corresponding to the voice information, a semantic recognition may be performed on the voice information to obtain voice text information. The voice text information may be understood as a semantic of the voice information. Then, at least one AR gesture animation corresponding to the voice text information is queried in a pre-stored AR gesture animation. It can be understood that each pre-stored AR gesture animation has a corresponding gesture semantic, and in a case where the gesture semantic and the voice text information match, the AR gesture animation corresponding to the gesture semantic is obtained. There may be multiple piece of voice text information. For example, if a semantic of the voice information is "Hello, welcome to our company", the voice text information can be "hello", "welcome", "to" and "our company". Finally, a sign language AR animation corresponding to the voice information is obtained according to the at least one AR gesture animation. It can be understood that the at least one AR gesture animation is sequentially stitched in an order of the voice text information to obtain the sign language AR animation.

Figure 4:
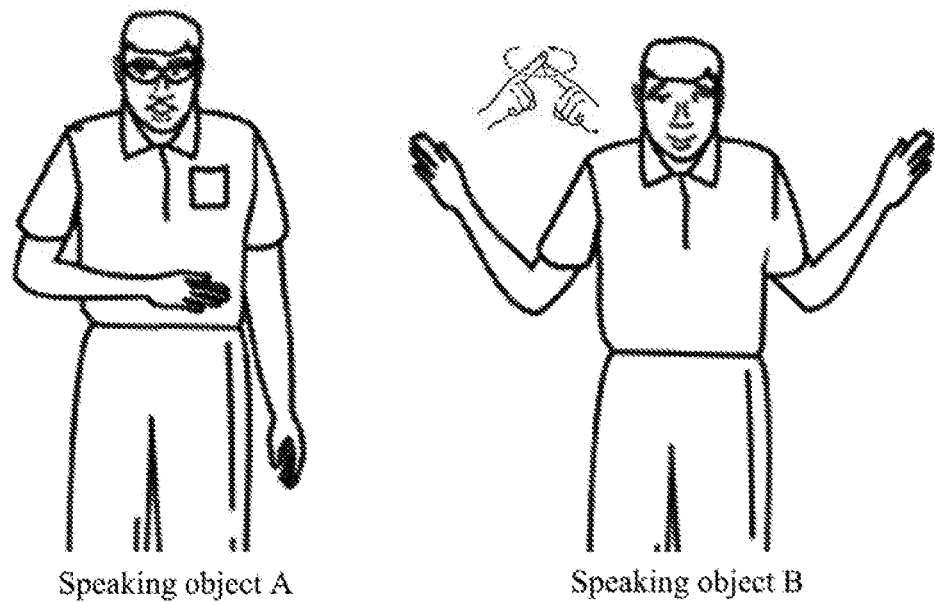
FIG. 4 is an example of a sign language video provided by an embodiment of the present disclosure.

In an implementation of obtaining the gesture area corresponding to the speaking object, an area around a face of the speaking object may be determined in the video information. Then, the gesture area corresponding to the speaking object is determined in the area around the face. Referring to FIG. 4, it is an example of a sign language video provided by an embodiment of the present disclosure. As shown in FIG. 4, an area in a left side of the face of the speaking object is taken as the gesture area, the AR sign language animation of a voice pronunciation of the speaking object is displayed on the left side of the face of the speaking object while the speaking object is speaking. The user is provided with convenience in determining the speaking object and the speaking content of the speaking object in the communication, and displaying the AR sign language animation near a face make the user's gaze direction close to the face of the speaking object, which avoid an impoliteness of the person with hearing impairment because of looking down at the translation information and improve the user experience.

Figure 5:
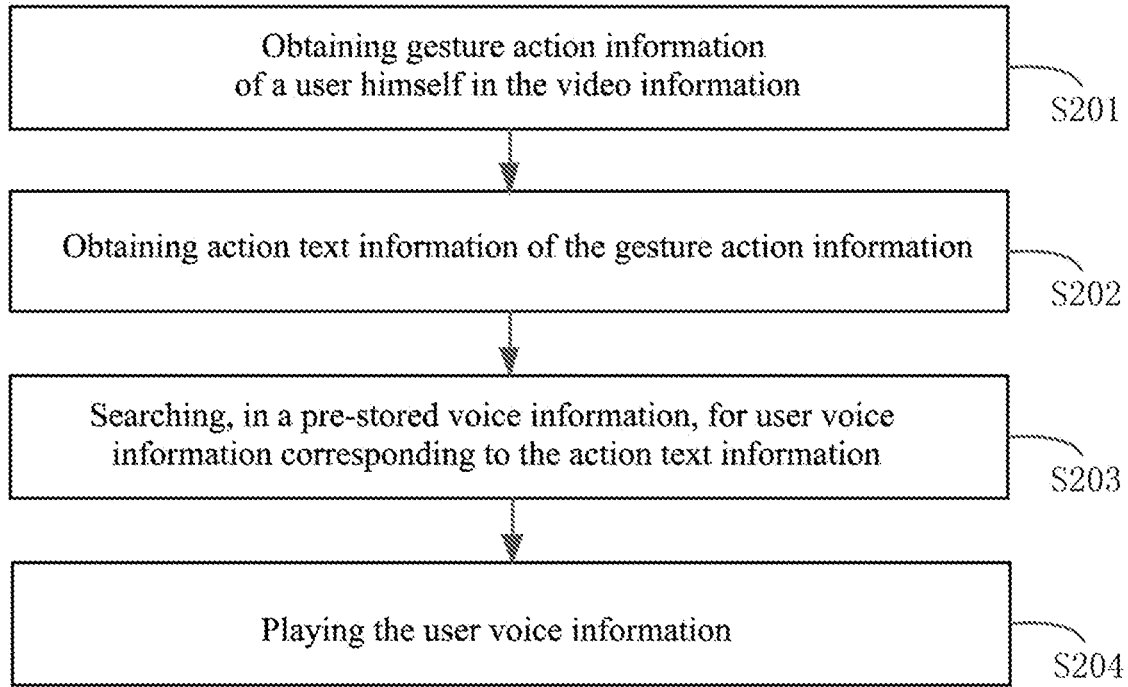
FIG. 5 is a schematic flowchart of another sign language information processing method provided by an embodiment of the present disclosure.

On the basis of the above embodiment, a process of translating the gesture into voice for outputting may be included simultaneously or after step S103 (superimposing and displaying the augmented reality AR sign language animation corresponding to the voice information on the gesture area corresponding to the speaking object to obtain the sign language video). Referring to FIG. 5, it is a schematic flowchart of another sign language information processing method provided by an embodiment of the present disclosure. The method shown in FIG. 5 mainly includes steps S201 to S204, which are specifically as follows:

S201: obtaining gesture action information of a user himself in the video information.

It can be understood that the gesture action information can be understood as a gesture action image. Recognizing the gesture action information of the user himself in the video information may be to recognize an image of a preset position. For example, gesture action information obtained in a lower edge area of a video frame is taken as the gesture action information of the user himself. It may also be to determine whether a gesture-like image is the gesture-like image of the user himself based on depth information of the gesture-like image in the video frame. The depth information may be understood as a distance between each object in the image and the camera. Specifically, the distance of the gesture-like image may be obtained in the video information first, where the distance indicates a distance between hands corresponding to the gesture-like image and the camera. Then, a gesture-like image whose distance is less than a threshold is determined as the gesture action information of the user himself. For example, a gesture-like image whose distance is less than 30 cm is taken as the gesture action information of the user himself.

S202: obtaining action text information of the gesture action information.

It can be understood that an action recognition is performed on the gesture action information, and the semantic thereof is used as the action text information.

S203: searching, in a pre-stored voice information, for user voice information corresponding to the action text information.

It can be understood that each pre-stored voice information has a corresponding preset semantic, and the action text information is compared with the preset semantic, and a voice information corresponding to the preset semantic that matches the action text information is taken as the user voice information.

S204: playing the user voice information.

In an embodiment, user sound attribute information preset by the user may be obtained, and then the user voice information is played with the user sound attribute. The user sound attribute information may be understood as a characteristic configuration of a sound that the user wants to output, which is configured in advance, for example, an old person's voice, a youth's voice, a child's voice, a man's voice, or a woman's voice, thereby realizing a customization of the user's voice. Therefore, different users are enabled to set the sound according to their own preferences, and other communication objects can better distinguish different persons with hearing impairment. For example, if the person with hearing impairment is a woman, then the user's voice attribute information can be set as a voice of a young woman, thereby distinguishing her from other persons with hearing impairment.

The sign language information processing method provided by the present disclosure achieves real-time collection of language data in a current communication of a user by obtaining voice information and video information collected by a user terminal in real time; and then matches a speaking person with his or her speaking content by determining, in the video information, a speaking object corresponding to the voice information; and finally, makes it possible for the user to clarify the corresponding speaking object when the user sees AR sign language animation in a sign language video by superimposing and displaying an augmented reality AR sign language animation corresponding to the voice information on a gesture area corresponding to the speaking object to obtain a sign language video. Therefore, it is possible to distinguish the speaking content of each speaking person in a multi-person discussion, clarify a viewpoint of each conversation object, thereby achieving normal communication with a person with normal hearing, and providing a higher user experience.

Figure 6:
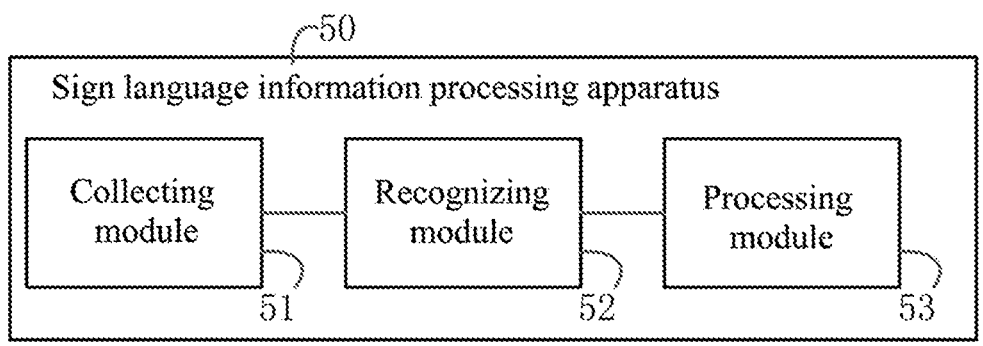
FIG. 6 is a schematic structural diagram of a sign language information processing apparatus provided by an embodiment of the present disclosure.

Referring to FIG. 6, it is a schematic structural diagram of a sign language information processing apparatus provided by an embodiment of the present disclosure. The sign language information processing apparatus 50 shown in FIG. 6 mainly includes:

a collecting module 51, configured to obtain voice information and video information collected by a user terminal in real time;

a recognizing module 52, configured to determine, in the video information, a speaking object corresponding to the voice information; and a processing module 53, configured to superimpose and display an augmented reality AR sign language animation corresponding to the voice information on a gesture area corresponding to the speaking object to obtain a sign language video.

The sign language information processing apparatus 50 of the embodiment shown in FIG. 6 may be correspondingly used to perform the steps in the method embodiment shown in FIG. 2, and the implementation principle and technical effects are similar, and details are not described herein again.

In an embodiment, the recognizing module 52 is specifically configured to:

recognize at least one face image in the video information;

determine a face image showing an opening and closing action of a lip as a target face image; and determine a portrait corresponding to the target face image as the speaking object corresponding to the voice information.

In an embodiment, the recognizing module 52, after determining the portrait corresponding to the target face image as the speaking object corresponding to the voice information, is further configured to:

obtain sound attribute information corresponding to the voice information; and associate and store the sound attribute information and the target face image.

In an embodiment, the recognizing module 52 is specifically configured to:

obtain sound attribute information corresponding to the voice information;

determine, in a pre-stored face set, a historical face image corresponding to the sound attribute information;

search, in the video information, for a target face image that matches the historical face image; and determine a portrait corresponding to the target face image as the speaking object corresponding to the voice information.

In an embodiment, the sound attribute information includes: amplitude information, audio information, and/or accent cycle information.

Figure 7:
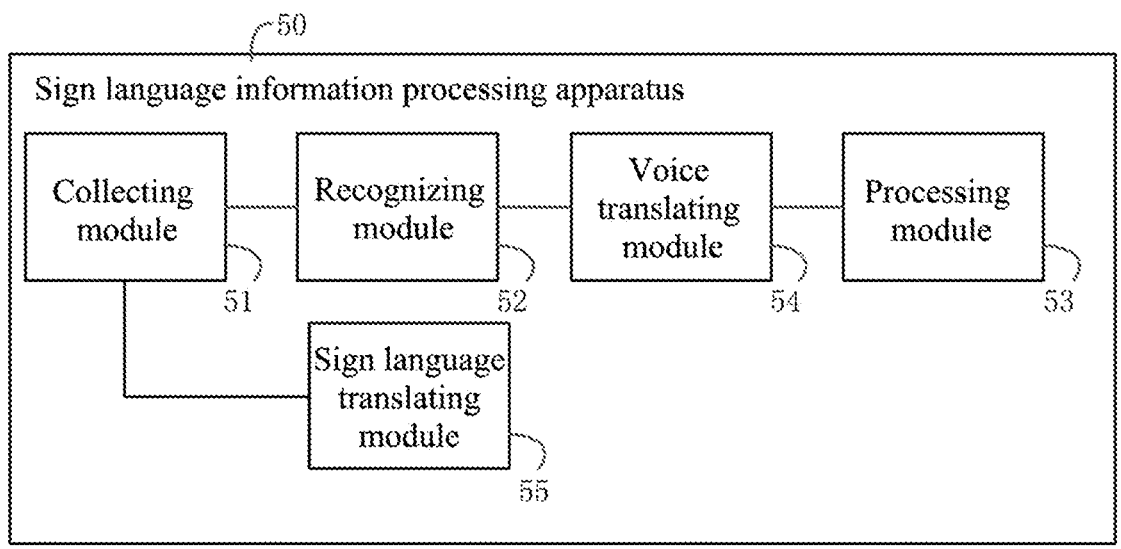
FIG. 7 is a schematic structural diagram of another sign language information processing apparatus provided by an embodiment of the present disclosure.

Referring to FIG. 7, it is a schematic structural diagram of another sign language information processing apparatus provided by an embodiment of the present disclosure. The sign language information processing apparatus 50 shown in FIG. 7 mainly further includes:

a voice translating module 54, configured to:

before the processing module superimposes and displays the augmented reality AR sign language animation corresponding to the voice information on the gesture area corresponding to the speaking object to obtain the sign language video, perform a semantic recognition on the voice information to obtain voice text information;

query, in a pre-stored AR gesture animation, at least one AR gesture animation corresponding to the voice text information; and obtain a sign language AR animation corresponding to the voice information according to the at least one AR gesture animation.

In an embodiment, the processing module 53, before the superimposing and displaying an augmented reality AR sign language animation corresponding to the voice information on a gesture area corresponding to the speaking object to obtain a sign language video, is further configured to:

determine, in the video information, an area around a face of the speaking object; and determine, in the area around the face, the gesture area corresponding to the speaking object.

In an embodiment, with continued reference to FIG. 7, a sign language translating module 55 is further included, which is configured to:

obtain gesture action information of a user himself in the video information;

obtain action text information of the gesture action information;

search, in a pre-stored voice information, for user voice information corresponding to the action text information; and play the user voice information.

The sign language information processing apparatus 50 of the embodiment shown in FIG. 7 may be correspondingly used to perform the steps in the method embodiment shown in FIG. 5, and the implementation principle and technical effects are similar, and details are not described herein again.

In an embodiment, the sign language translating module is specifically configured to:

obtain a distance of a gesture-like image in the video information, where the distance indicates a distance between hands corresponding to the gesture-like image and a camera; and determine a gesture-like image whose distance is less than a threshold as the gesture action information of the user himself.

Figure 8:
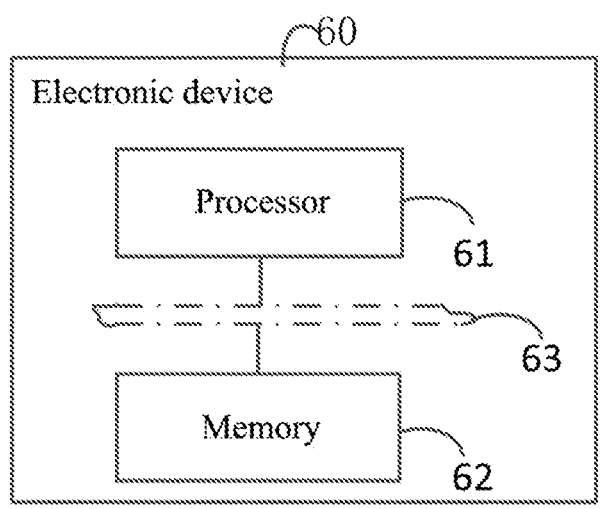
FIG. 8 is a schematic structural diagram of hardware of an electronic device provided by an embodiment of the present disclosure.

Referring to FIG. 8, it is a schematic structural diagram of hardware of an electronic device provided by an embodiment of the present disclosure. The electronic device 60 includes: a processor 61, a memory 62 and a computer program.

The memory 62 is configured to store the computer program, and the memory may also be a flash memory. The computer program is, for example, an application program, a function module, or the like, that implements the above method.

The processor 61 is configured to perform the computer program stored in the memory to implement the steps in the above method. For details, reference may be made to the related description in the foregoing method embodiments.

In an embodiment, the memory 62 may be either independent or integrated with the processor 61.

When the memory 62 is a device independent of the processor 61, the electronic device 60 may further include:

a bus 63, configured to connect the memory 62 and the processor 61.

Figure 9:
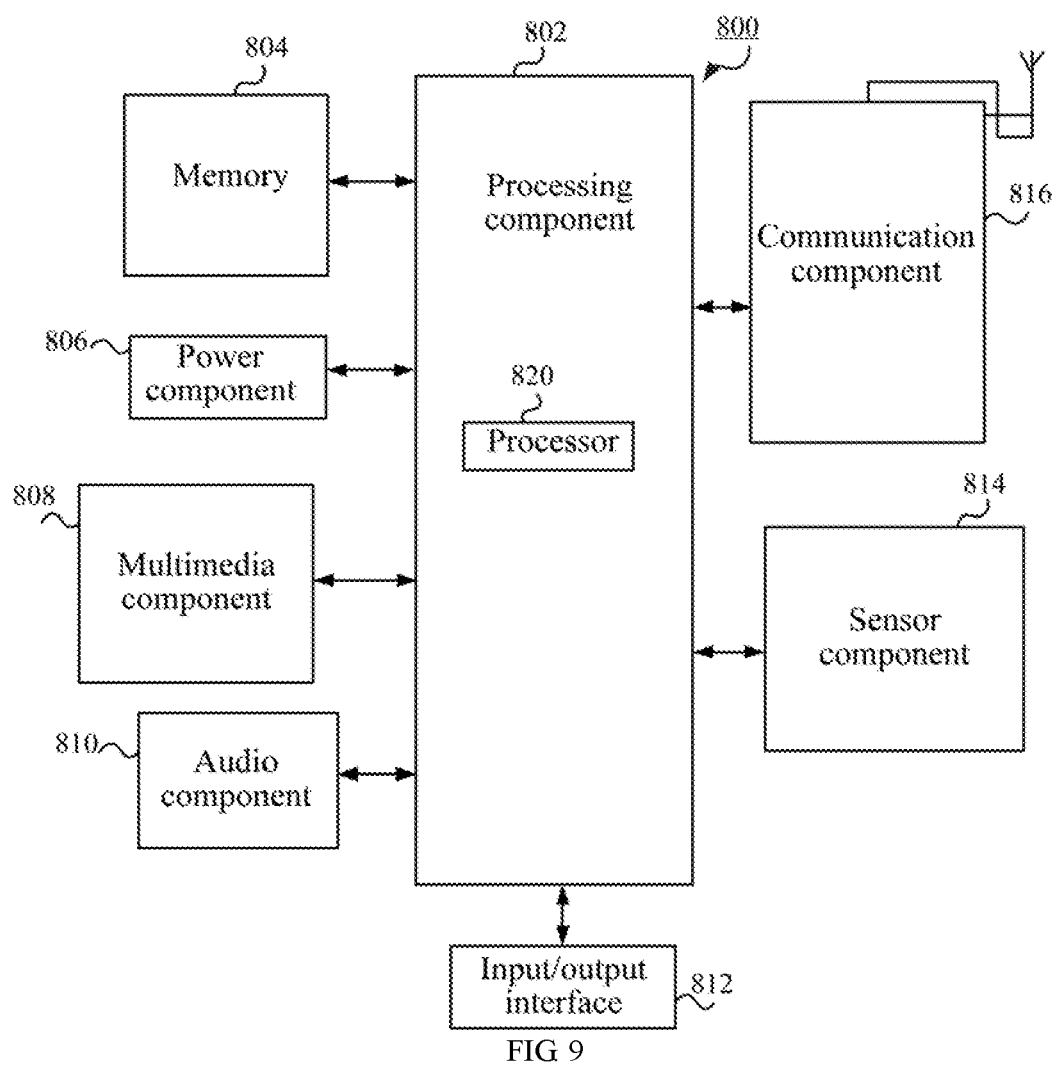
FIG. 9 is an example of an electronic device shown in FIG. 8 provided by an embodiment of the present disclosure.

Referring to FIG. 9, it is an example of an electronic device shown in FIG. 8 provided by an embodiment of the present disclosure. On the basis of the embodiment shown in FIG. 9, the electronic device may specifically be a terminal device 800 as shown in FIG. 9. For example, the terminal device 800 may be a mobile phone, a computer, a digital broadcast terminal, a messaging device, a game console, a tablet device, a medical device, a fitness device, a personal digital assistant, or the like.

With continued reference to FIG. 9, the electronic device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operation of the electronic device 800, such as operations associated with display, telephone calls, data communications, camera operations, and recording operations. The processing component 802 may include one or more processors 820 to execute instructions, so as to perform all or part of the steps of the above described methods. Moreover, the processing component 802 may include one or more modules to facilitate interaction between the processing component 802 and other components. For example, the processing component 802 may include a multimedia module to facilitate an interaction between the multimedia component 808 and the processing component 802.

The memory 804 is configured to store various types of data to support operations at the electronic device 800. Examples of such data include instructions for any application or method that are operated on the electronic device 800, contact data, phone book data, messages, pictures, videos, or the like. The memory 804 may be implemented by any type of volatile or non-volatile storage device, or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), magnetic memory, flash memory, disk or optical Disk.

The power component 806 provides power to various components of the electronic device 800. The power component 806 may include a power management system, one or more power sources, and other components associated with generating, managing, and distributing power for the electronic device 800.

The multimedia component 808 includes a screen between the electronic device 800 and a user that provides an output interface. In some embodiments, the screen may include a liquid crystal display (LCD) and a touch panel (TP). If the screen includes the touch panel, the screen can be implemented as a touch screen to receive an input signal from a user. The touch panel includes one or more touch sensors to sense touches, slides, and gestures on the touch panel. The touch sensor may not only sense a boundary of the touch or sliding action, but also detect duration and pressure associated with the touch or sliding operation. In some embodiments, the multimedia component 808 includes a front camera and/or a rear camera. When the electronic device 800 is in an operation mode, such as a shooting mode or a video mode, the front camera and/or the rear camera can receive external multimedia data. Each front camera and rear camera may be a fixed optical lens system or have focal length and optical focusing capability.

The audio component 810 is configured to output and/or input an audio signal. For example, the audio component 810 includes a microphone (MIC) that is configured to receive an external audio signal when the electronic device 800 is in the operation mode, such as a call mode, a recording mode, and a voice recognition mode. The received audio signal may be further stored in the memory 804 or sent via the communication component 816. In some embodiments, the audio component 810 further includes a speaker configured to output the audio signal.

The I/O interface 812 provides an interface between the processing component 802 and a peripheral interface module, where the peripheral interface module may be a keyboard, a click wheel, a button, or the like. These buttons may include, but are not limited to, a home button, a volume button, a start button, and a lock button.

The sensor component 814 includes one or more sensors configured to provide the electronic device 800 with a status assessment of various aspects. For example, the sensor component 814 may detect an on/off state of the electronic device 800, relative positioning of components, which is, for example, a display and a keypad of the electronic device 800. The sensor component 814 may also detect a position change of the electronic device 800 or one component of the electronic device 800, presence or absence of contact between a user and the electronic device 800, an orientation or acceleration/deceleration of the electronic device 800, and a temperature change of the electronic device 800. The sensor component 814 may include a proximity sensor configured to detect presence of nearby objects without any physical contact. The sensor component 814 may further include a light sensor, such as a CMOS or CCD image sensor configured to use in imaging applications. In some embodiments, the sensor component 814 may further include an acceleration sensor, a gyro sensor, a magnetic sensor, a pressure sensor, or a temperature sensor.

The communication component 816 is configured to facilitate wired or wireless communication between the electronic device 800 and other devices. The electronic device 800 can access a wireless network based on a communication standard, such as WiFi, 2G or 3G, or a combination thereof. In an exemplary embodiment, the communication component 816 receives a broadcast signal or broadcast associated information from an external broadcast management system via a broadcast channel. In an exemplary embodiment, the communication component 816 further includes a near field communication (NFC) module to facilitate a short range communication. For example, the NFC module can be implemented based on radio frequency identification (RFID) technology, infrared data association (IrDA) technology, ultra-wideband (UWB) technology, Bluetooth (BT) technology, and other technologies.

In an exemplary embodiment, the electronic device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above methods.

The present disclosure further includes a readable storage medium, where the readable storage medium stores a computer program, and the computer program, when executed by a processor, implements the methods provided by various implementations described above.

The readable storage medium may be a computer storage medium or a communication medium. The communication media includes any medium that facilitates a transfer of a computer program from one location to another. The computer storage medium may be any available media that may be accessed by a general purpose or special purpose computer. For example, a readable storage medium is coupled to a processor, such that the processor can read information from the readable storage medium and can write information to the readable storage medium. Of course, the readable storage medium may also be an integral part of the processor. The processor and the readable storage medium may be located in an Application Specific Integrated Circuits (ASIC). Additionally, the ASIC can be located in a user equipment. Of course, the processor and the readable storage medium can also reside as discrete components in a communication device. The readable storage medium may be a Read Only Memory (ROM), a Random Access Memory (RAM), a CD-ROM, a magnetic tape, a floppy disk, and an optical data storage device.

The present disclosure further provides a program product including execution instructions stored in a readable storage medium. At least one processor of a device can read the execution instructions from the readable storage medium, and the at least one processor executes the execution instructions, such that the device implements the methods provided by the various implementations described above.

In the above embodiment of the electronic device, it should be understood that the processor may be a Central Processing Unit (CPU for short), or another general purpose processor, a Digital Signal Processor (DSP for short), an Application Specific Integrated Circuit (ASIC for short), or the like. The general purpose processor may be a microprocessor, or the processor may be any conventional processor or the like. The steps of the method disclosed in connection with the present disclosure may be directly embodied as being executed by a hardware processor or by a combination of hardware and software modules in the processor.

Finally, it should be noted that the above embodiments are merely illustrative of the technical solutions of the present disclosure, and are not intended to limit thereto; although the present disclosure has been described in detail with reference to the foregoing embodiments, those skilled in the art will understand that the technical solutions described in the foregoing embodiments may be modified, or some or all of the technical features thereof may be equivalently replaced; and the modifications or substitutions do not deviate the essence of corresponding technical solutions from the scope of the technical solutions of the embodiments of the present disclosure.

What is claimed is:

1. A sign language information processing method, comprising:
   obtaining voice information and video information collected by a user terminal in real time;
   determining, in the video information, a speaking object corresponding to the voice information; and
   superimposing and displaying an augmented reality (AR) sign language animation corresponding to the voice information on a gesture area corresponding to the speaking object to obtain a sign language video,
   wherein the determining, in the video information, a speaking object corresponding to the voice information comprises:
   obtaining sound attribute information corresponding to the voice information, wherein the sound attribute information comprises accent cycle information;
   determining, in a pre-stored face set, a historical face image corresponding to the sound attribute information;
   searching, in the video information, for a target face image that matches the historical face image; and
   determining a portrait corresponding to the target face image, as the speaking object corresponding to the voice information.

2. The method according to claim 1, wherein the determining, in the video information, a speaking object corresponding to the voice information further comprises:
   recognizing at least one face image in the video information;
   determining, from the at least one face image, a face image showing an opening and closing action of a lip as a target face image; and
   determining a portrait corresponding to the target face image, as the speaking object corresponding to the voice information; and
   wherein after the determining a portrait corresponding to the target face image as the speaking object corresponding to the voice information, the method further comprises:
   obtaining the sound attribute information corresponding to the voice information; and
   associating and storing the sound attribute information and the target face image.

3. The method according to claim 2, wherein the sound attribute information further comprises at least one of: amplitude information, and audio information.

4. The method according to claim 2, wherein the determining, from the at least one face image, a face image showing an opening and closing action of a lip as a target face image, comprising:
in response to sequentially detecting, from face images of continuous video frames of the video information, lip open images and lip closed images for face images of a same person within a preset time, determining one of the face images of the same person as the target face image.

5. The method according to claim 1, wherein before the superimposing and displaying an augmented reality (AR) sign language animation corresponding to the voice information on a gesture area corresponding to the speaking object to obtain a sign language video, the method further comprises:
performing a semantic recognition on the voice information to obtain voice text information;
querying, in a pre-stored AR gesture animation, at least one AR gesture animation corresponding to the voice text information; and
obtaining a sign language AR animation corresponding to the voice information according to the at least one AR gesture animation.

6. The method according to claim 1, wherein before the superimposing and displaying an augmented reality (AR) sign language animation corresponding to the voice information on a gesture area corresponding to the speaking object to obtain a sign language video, the method further comprises:
determining, in the video information, an area around a face of the speaking object; and
determining, in the area around the face, the gesture area corresponding to the speaking object.

7. The method according to claim 1, further comprising:
obtaining gesture action information of a user himself in the video information;
obtaining action text information of the gesture action information;
searching, in a pre-stored voice information, for user voice information corresponding to the action text information; and
playing the user voice information.

8. The method according to claim 7, wherein the obtaining gesture action information of a user himself in the video information comprises:
obtaining a distance of a gesture-like image in the video information, wherein the distance indicates a distance between hands corresponding to the gesture-like image and a camera; and
determining a gesture-like image whose distance is less than a threshold as the gesture action information of the user himself.

9. The method according to claim 7, wherein the obtaining gesture action information of a user himself in the video information, comprising:
obtaining gesture action information in a lower edge area of a video frame in the video information, as the gesture action information of the user himself.

10. The method according to claim 1, wherein the obtaining voice information and video information collected by a user terminal, comprising:
in response to detecting the voice information, collecting, by the user terminal, the video information in real time; and
in response to detecting that the voice information ends, stopping, by the user terminal, collection of the video information.

11. The method according to claim 1, wherein the obtaining voice information and video information collected by a user terminal, comprising:
in response to detecting the video information, collecting, by the user terminal, the voice information in real time; and
in response to detecting that the video information ends, stopping, by the user terminal, collection of the voice information.

12. A sign language information processing apparatus, comprising:
a memory, a processor, and a computer program stored on the memory and operable on the processor,
wherein the processor, when running the computer program, is configured to:
obtain voice information and video information collected by a user terminal in real time;
determine, in the video information, a speaking object corresponding to the voice information; and
superimpose and display an augmented reality (AR) sign language animation corresponding to the voice information on a gesture area corresponding to the speaking object to obtain a sign language video,
wherein the processor is further configured to:
obtain sound attribute information corresponding to the voice information, wherein the sound attribute information comprises accent cycle information;
determine, in a pre-stored face set, a historical face image corresponding to the sound attribute information;
search, in the video information, for a target face image that matches the historical face image; and
determine a portrait corresponding to the target face image, as the speaking object corresponding to the voice information.

13. The apparatus according to claim 12, wherein the processor is further configured to:
recognize at least one face image in the video information;
determine, from the at least one face image, a face image showing an opening and closing action of a lip as a target face image; and
determine a portrait corresponding to the target face image, as the speaking object corresponding to the voice information; and
wherein the processor, after determining the portrait corresponding to the target face image as the speaking object corresponding to the voice information, is further configured to:
obtain the sound attribute information corresponding to the voice information; and
associate and store the sound attribute information and the target face image.

14. The apparatus according to claim 13, wherein the sound attribute information further comprises at least one of: amplitude information, and audio information.

15. The apparatus according to claim 12, wherein the processor is further configured to:
before superimposing and displaying the augmented reality (AR) sign language animation corresponding to the voice information on the gesture area corresponding to the speaking object to obtain the sign language video,
perform a semantic recognition on the voice information to obtain voice text information;

query, in a pre-stored AR gesture animation, at least one AR gesture animation corresponding to the voice text information; and obtain a sign language AR animation corresponding to the voice information according to the at least one AR gesture animation.

16. The apparatus according to claim 12, wherein the processor, before the superimposing and displaying an augmented reality (AR) sign language animation corresponding to the voice information on a gesture area corresponding to the speaking object to obtain a sign language video, is further configured to:

determine, in the video information, an area around a face of the speaking object; and determine, in the area around the face, the gesture area corresponding to the speaking object.

17. The apparatus according to claim 12, wherein the processor is further configured to:

obtain gesture action information of a user himself in the video information;

obtain action text information of the gesture action information;

search, in a pre-stored voice information, for user voice information corresponding to the action text information; and play the user voice information.

18. The apparatus according to claim 17, wherein the processor is further configured to:

obtain a distance of a gesture-like image in the video information, wherein the distance indicates a distance between hands corresponding to the gesture-like image and a camera.

19. The apparatus according to claim 18, wherein the processor is further configured to:

determine a gesture-like image whose distance is less than a threshold as the gesture action information of the user himself.

20. A non-transitory readable storage medium, wherein the non-transitory readable storage medium stores a computer program, and the computer program, when executed by a processor, implements the sign language information processing method according to claim 1.

* * * * *